(12) United States Patent
Silberberg

(10) Patent No.: US 10,976,159 B1
(45) Date of Patent: Apr. 13, 2021

(54) MAGNETIC BUBBLE TYPE LEVEL

(71) Applicant: Mark L. Silberberg, Boerne, TX (US)

(72) Inventor: Mark L. Silberberg, Boerne, TX (US)

(*) Notice: Subject to any disclaimer, the term of this patent is extended or adjusted under 35 U.S.C. 154(b) by 0 days.

(21) Appl. No.: 16/985,098

(22) Filed: Aug. 4, 2020

Related U.S. Application Data

(60) Provisional application No. 62/883,939, filed on Aug. 7, 2019.

(51) Int. Cl.
*G01C 9/28* (2006.01)
*G01C 9/34* (2006.01)

(52) U.S. Cl.
CPC ............... *G01C 9/28* (2013.01); *G01C 9/34* (2013.01)

(58) Field of Classification Search
CPC .................................... G01C 9/28; G01C 9/34
USPC .................................... 33/347, 379, 381, 390
See application file for complete search history.

(56) References Cited

U.S. PATENT DOCUMENTS

| | | | | |
|---|---|---|---|---|
| 4,394,799 A * | 7/1983 | Moree | ...................... | G01C 9/28 33/343 |
| 5,256,006 A * | 10/1993 | Harding | ............... | E04H 12/2284 173/130 |
| 5,421,094 A * | 6/1995 | McCord | ................... | G01C 9/28 33/371 |
| 6,029,359 A * | 2/2000 | Szumer | .................... | G01C 9/28 33/373 |
| 6,839,973 B1 * | 1/2005 | Woodward | ............... | G01C 9/28 33/343 |
| D509,158 S | 9/2005 | Silberberg | | |
| D538,186 S | 3/2007 | Silberberg | | |
| D576,063 S | 9/2008 | Silberberg | | |
| D595,165 S | 6/2009 | Silberberg | | |
| 7,669,342 B1 * | 3/2010 | Crain | ...................... | G01C 9/28 33/372 |
| D644,945 S | 9/2011 | Silberberg | | |
| D644,946 S | 9/2011 | Silberberg | | |
| D644,947 S | 9/2011 | Silberberg | | |
| D694,136 S | 11/2013 | Silberberg | | |
| D719,470 S | 12/2014 | Silberberg | | |
| D722,509 S | 2/2015 | Silberberg | | |
| D722,510 S | 2/2015 | Silberberg | | |
| D722,511 S | 2/2015 | Silberberg | | |
| D722,512 S | 2/2015 | Silberberg | | |
| D722,513 S | 2/2015 | Silberberg | | |
| D722,514 S | 2/2015 | Silberberg | | |
| D722,897 S | 2/2015 | Silberberg | | |
| D730,206 S | 5/2015 | Silberberg | | |
| 9,021,710 B2 | 5/2015 | Silberberg | | |
| 9,151,606 B2 | 10/2015 | Silberberg | | |
| 9,360,315 B2 | 6/2016 | Silberberg | | |
| 9,551,574 B2 | 1/2017 | Silberberg | | |

(Continued)

*Primary Examiner* — George B Bennett
(74) *Attorney, Agent, or Firm* — Volk & McElroy, LLP; Michael D. Volk, Jr.

(57) ABSTRACT

A specially designed bubble type level usable to verify that an angle made in a tubular structure for example, electrical conduit, is level. The apparatus is particularly useful during manual bending of electrical conduit and similar field-modified tubular structures. The apparatus allows for quick and efficient magnetic coupling to metallic conduit, without the need to turn a thumbwheel or screw. In addition, the apparatus of the present disclosure comprises a compact physical size, allowing the device to be operated with one hand and to easily fit into a user's pocket.

20 Claims, 5 Drawing Sheets

(56) References Cited

U.S. PATENT DOCUMENTS

| | | | |
|---|---|---|---|
| 2012/0151785 A1* | 6/2012 | Lettkeman | G01C 9/24 33/301 |
| 2013/0283625 A1* | 10/2013 | Sullivan | G01C 9/28 33/371 |
| 2014/0007439 A1 | 1/2014 | Silberberg | |
| 2015/0075017 A1* | 3/2015 | Christianson | G01C 9/28 33/371 |
| 2015/0096182 A1 | 4/2015 | Silberberg | |
| 2015/0308820 A1 | 10/2015 | Silberberg | |
| 2016/0025490 A1* | 1/2016 | Hoppe | G01C 9/26 33/381 |
| 2017/0183891 A1* | 6/2017 | Roddy | E04H 17/26 |
| 2020/0094381 A1* | 3/2020 | Molina | B25B 5/14 |
| 2020/0130144 A1* | 4/2020 | DeArmond | B25B 5/006 |

* cited by examiner

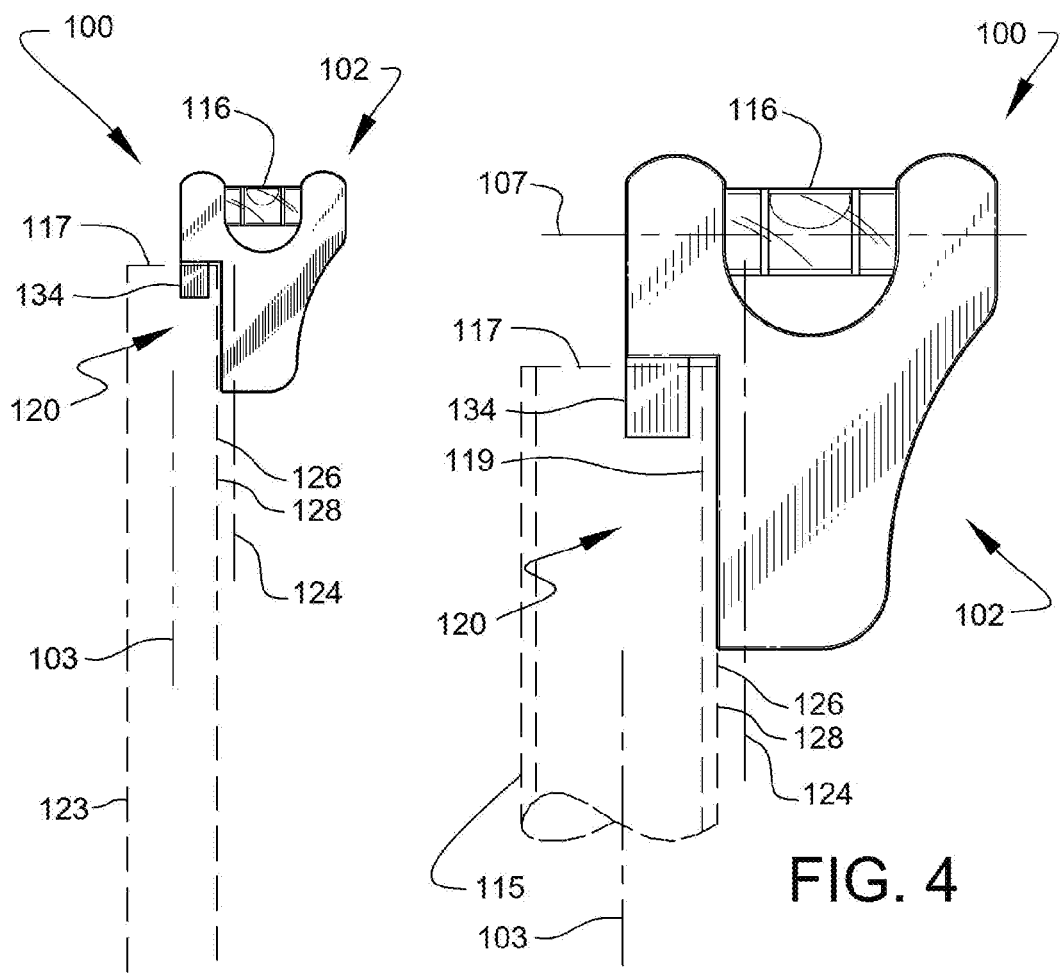
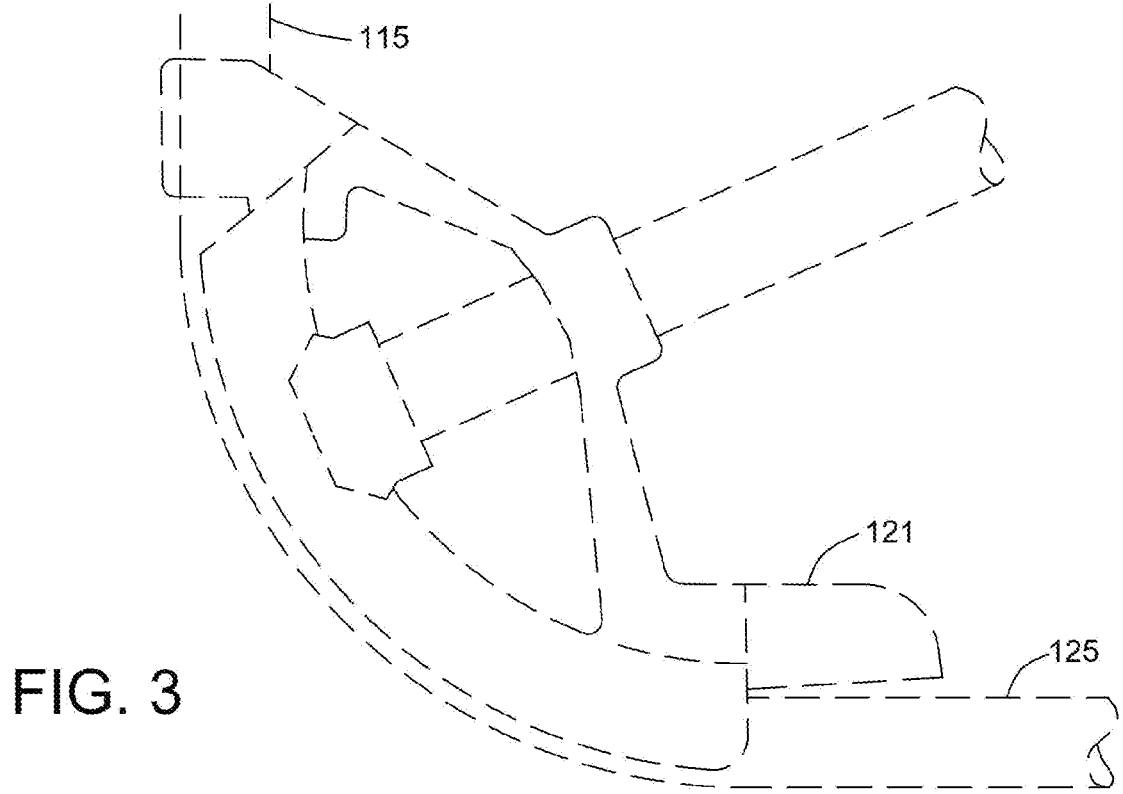
FIG. 3
FIG. 4

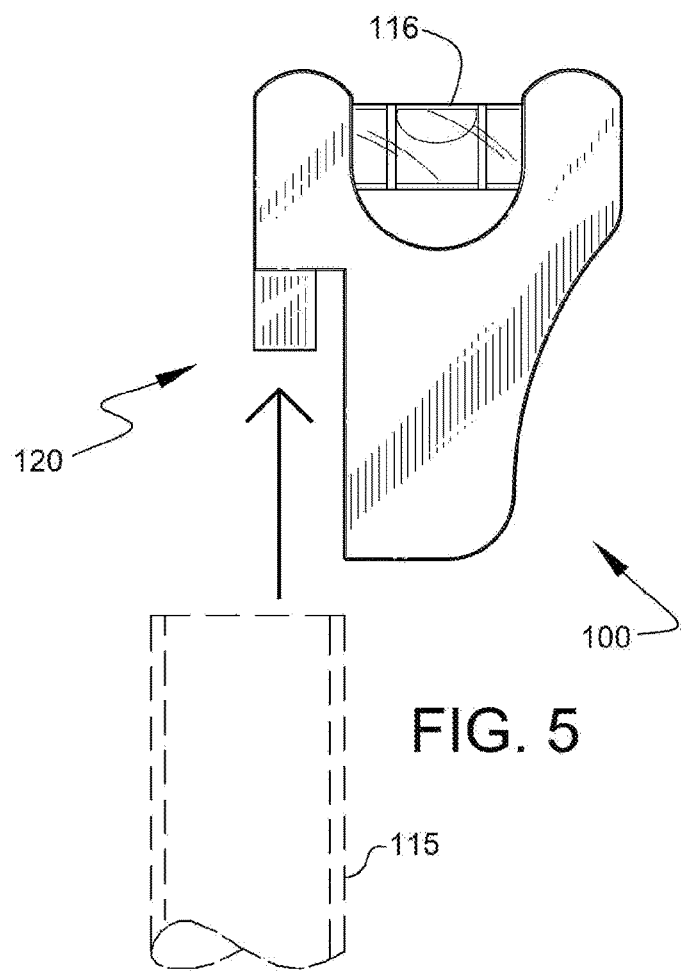
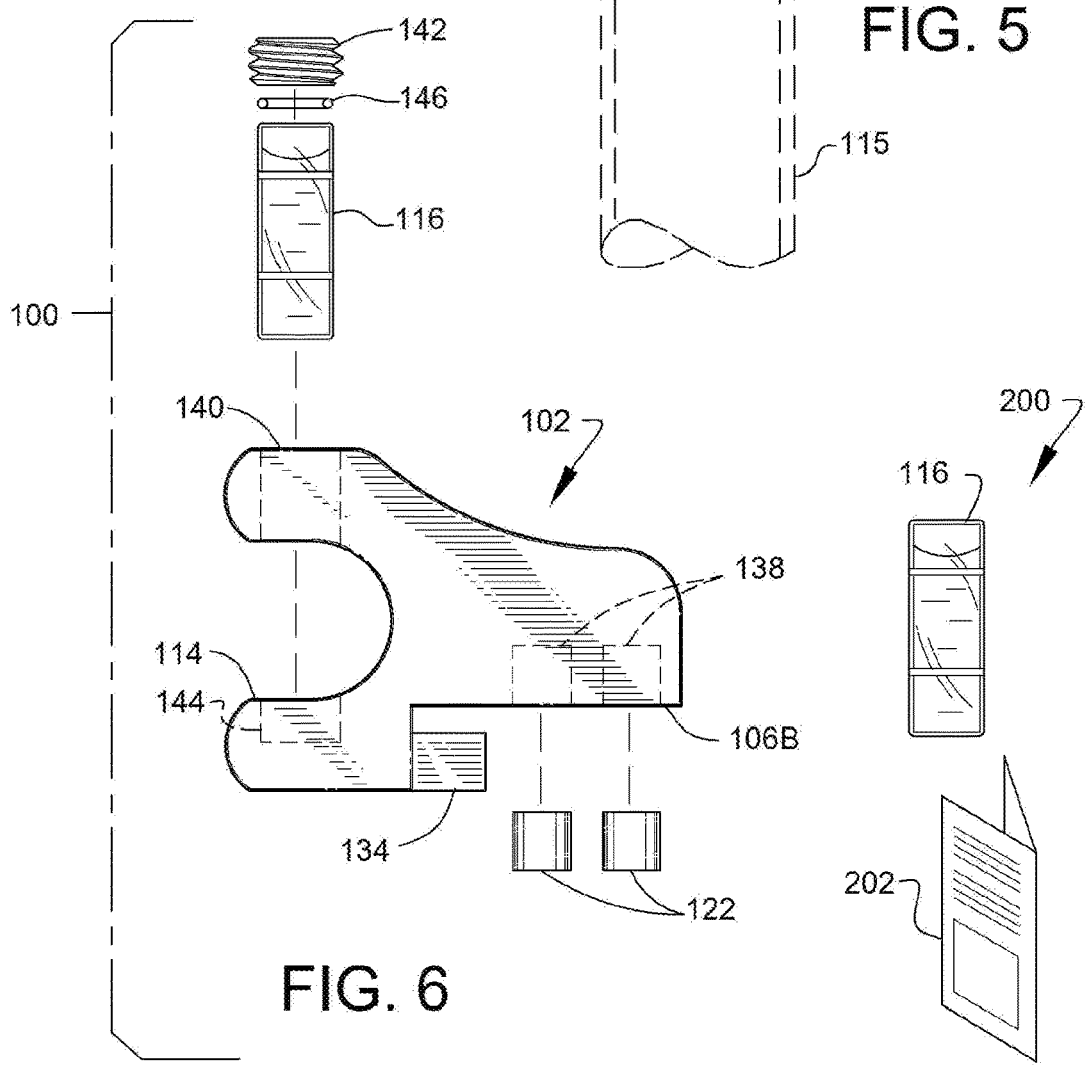
FIG. 5
FIG. 6

MAGNETIC BUBBLE TYPE LEVEL

CROSS-REFERENCE TO RELATED APPLICATIONS

The present application is related to and claims priority from prior provisional application Ser. No. 62/883,939, filed Aug. 7, 2019, titled "MAGNETIC BUBBLE LEVEL", the contents of all of which are incorporated herein by this reference and are not admitted to be prior art with respect to the present invention by the mention in this cross-reference section.

BRIEF DESCRIPTION OF THE DRAWINGS

FIG. 3 shows a side view illustrating the magnetic bubble type level of FIG. 1 in an 'in-use' condition in which the magnetic bubble type level is engaged on a tubular structure to be bent.

FIG. 4 shows a side view, enlarged for clarity, illustrating the magnetic bubble type level in the 'in-use' condition of FIG. 4.

FIG. 5 shows a side view illustrating the magnetic bubble type level of FIG. 1 being disengaged from the tubular structure.

FIG. 6 shows an exploded side view of the magnetic bubble type level of FIG. 1.

DETAILED DESCRIPTION

The present invention relates generally to tools used in the construction industry. More particularly, the invention concerns a specially designed bubble type level for determining the orientation of a structure, such as an elongate pipe. The bubble type level of the present disclosure includes one or more rare earth magnet(s) of intense field strength whose function is to hold onto any size elongate pipe without additional uses of clamps, screws, or similar methods requiring additional time and step(s) to affix a bubble level to an elongate pipe. The apparatus is particularly useful during manual bending of metallic electrical conduit and similar field-modified tubular structures as the apparatus provides a convenient and readily-discernible indication when a tubular structure that is being bent has been brought to a predetermined bend angle.

Each bubble vial of the apparatus is secured within the level body with a removable threaded retainer in a manner such that if the bubble vial becomes broken or otherwise damaged, the vials can be easily replaced and the level need not be discarded. In addition, the apparatus of the present disclosure comprises a compact physical size, allowing the device to be operated or performed by or with one hand and to fit into a user's pocket.

Figure 1:
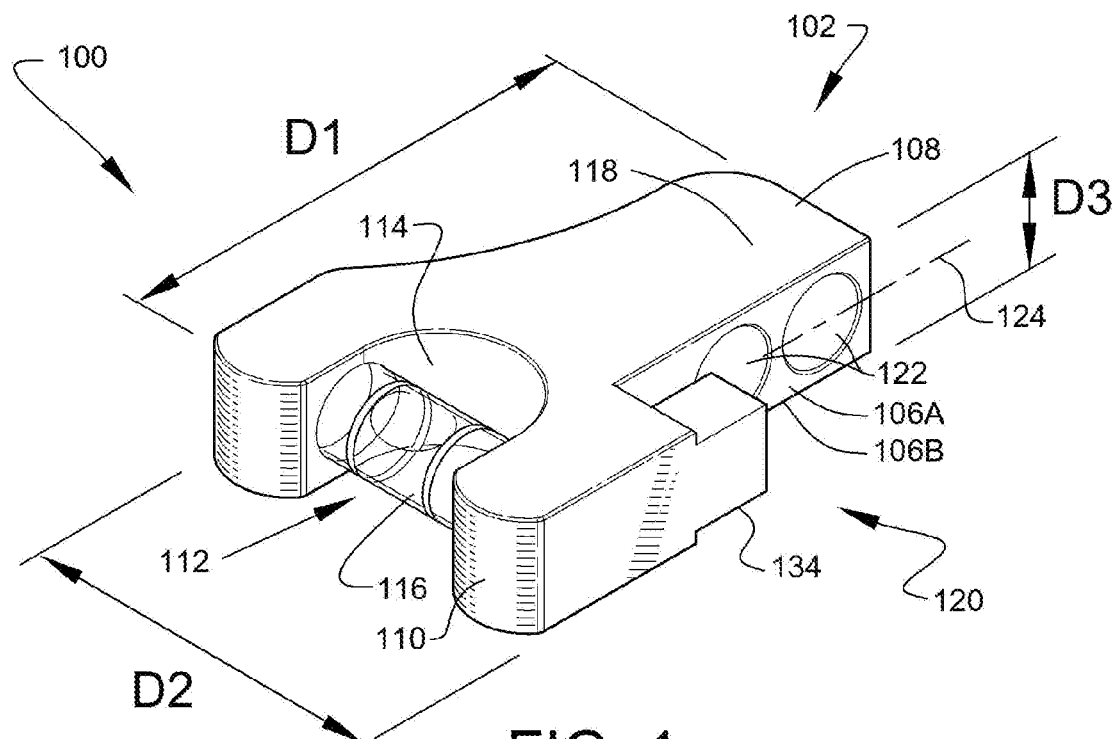
FIG. 1 shows a perspective view illustrating a magnetic bubble type level according to an implementation of the present disclosure.
Figure 2:
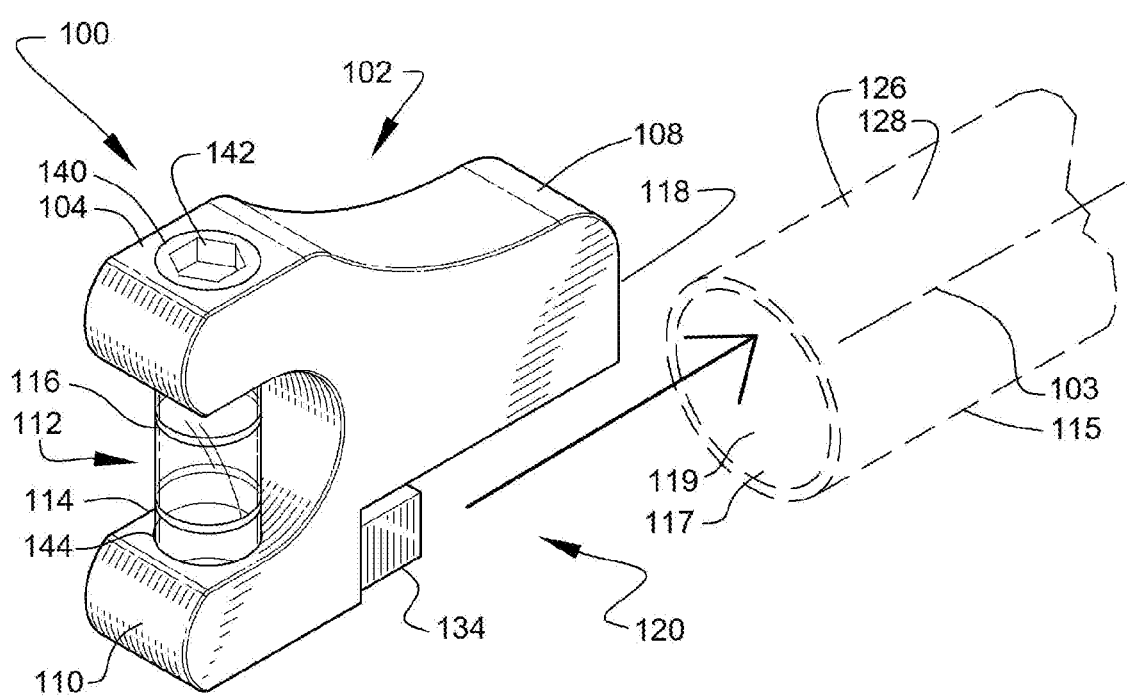
FIG. 2 shows a second perspective view illustrating the magnetic bubble type level of FIG. 1.

Referring now more specifically to the drawings by numerals of reference, FIG. 1 through FIG. 8 show various views of a magnetic bubble type level 100. FIG. 1 shows a perspective of a magnetic bubble type level 100, according to an implementation of the present disclosure. FIG. 2 shows a second perspective view illustrating the magnetic bubble type level 100. As above, the magnetic bubble type level 100 of the present disclosure is particularly useful in field verifying the angular displacement of a bend in a metallic tubular structure during and after a bending procedure. Although a segment of metallic electrical conduit is diagrammatically illustrated in the present descriptions, it should be noted that the magnetic bubble type level 100 will accommodate a wide range of ferromagnetic conduits, channels, angles, pipes, and the like.

The magnetic bubble type level 100 includes a body portion 102 having a top surface 104, a planar lower surface 106A, a front portion 108, and a rear portion 110, as shown. The body portion 102 further includes at least one level indicator 112 used to indicate horizontal (level) or vertical (plumb). In the magnetic bubble type level 100 of the present disclosure, the front portion 108 includes a vial-containing slot 114 housing a bubble vial 116. The placement of the bubble vial 116 within the body portion 102 affords an unobstructed 180-degree view of the bubble vial 116 during use, as shown.

A level indicator, implemented herein as bubble vial 116 (also commonly referred to as a spirit level) may be a cylindrical liquid-filled vial of conventional design. A bubble vial 116 suitable for use in the presently disclosed system comprises a diameter of about 8 millimeters and a length of about 22.4 millimeters and may comprise UV protection features for durability in service. Those with ordinary skill in the art will now appreciate that upon reading this specification and by their understanding the art of bubble vials and spirit levels, as described herein, methods of implementing and operating such devices will be understood by those knowledgeable in such art. Upon reading this specification, it should be further appreciated that, under appropriate circumstances, other level indicator arrangements such as, for example, utilization of electronic angle meters, plumb bobs, alternate analog and digital references, etc., may be utilized.

Quick coupling and decoupling of the apparatus to/from the electrical conduit 115 is a primary feature of the magnetic bubble type level 100. To achieve this objective, the body portion 102 includes a specially designed conduit connection system 120 (also referred to as a conduit connection portion), which functions to allow quick and efficient coupling of the magnetic bubble type level 100 to an electrical conduit 115, without the use of clamps or similar manually-tightened anchoring assemblies. As shown, for example, in FIG. 2, the magnetic bubble type level 100 is secured to a sidewall surface of the electrical conduit by attractive force between the electrical conduit sidewall and the magnets of the magnetic bubble type level 100. Importantly, there is not an opposing force on an opposing sidewall surface of the electrical conduit (see FIGS. 3 and 4). In the implementation shown, the magnetic portion of the magnetic bubble type level 100 attaches to the outer surface of the electrical conduit sidewall at the open end of the conduit. Another portion (a protruding positioning element), described further herein, enters the open end of the electrical conduit opening. Those with skill in the art will understand that the magnetic bubble type level 100 may be reconfigured so that the magnetic portion is inserted into the electrical conduit opening and interfaces and attaches to the inner surface of the electrical conduit sidewall with the same effect. Put another way, protruding positioning element 134 may be modified to contain the magnets to interface and attach to the inner sidewall surface at the open end of the electrical conduit.

According to an implementation of the present disclosure, conduit connection system 120 comprises front portion 108. Front portion 108 comprises a protruding element 118 incorporating a magnetically-attractive planar lower surface 106B, as shown. The magnetically-attractive planar lower surface 106B is formed by recessing at least one permanent magnet 122 into the planar lower surface 106A of the protruding element 118, as best seen in the perspective view of FIG. 2. The use of permanent magnets enables the apparatus to be removably secured to the electrical conduit 115 using an attractive magnetic force exerted between the magnetically-attractive planar lower surface 106B and the electrical conduit when the two elements are brought into contact.

According to an implementation of the present disclosure, two rare-earth permanent magnets 122 are used in series, as shown. Rare-earth permanent magnets suitable for use in the present disclosure include commercially produced neodymium magnets (also known as NdFeB magnets).

According to an implementation to the present disclosure, the permanent magnets 122 are arranged in colinear alignment along an axis 124 running generally parallel to magnetically-attractive planar lower surface 106B of the apparatus, as shown. Together, the permanent magnets 122 produce a combined magnetic force capable of firmly coupling the apparatus to the outer wall of the electrical conduit 115. Moreover, a colinear orientation or alignment of the permanent magnets 122 produces a magnetic field that usefully biases the orientation of the magnetically-attractive planar lower surface 106B (and associated axis 124) into a generally parallel relationship with the longitudinal axis 103 of the electrical conduit 115. Thus, the magnet-containing protruding element 118 functions to both magnetically attach and magnetically align the bubble type level 100 to a surface sidewall 126 of the electrical conduit 115. In more specific terms, the magnet-containing protruding element 118 functions to magnetically attach and magnetically align the bubble type level 100 to an outer (external) surface 128 of the electrical conduit 115, as illustrated in FIG. 3 and FIG. 4.

The conduit connection system 120 of the present disclosure includes a second protruding element 134 (a protruding positioning element) located in a spaced-apart relationship below the planar lower surface 106A, as shown. The second protruding element 134 is of shorter length than the magnet-containing protruding element 118 and is extendable within an open end 117 of the electrical conduit 115, as illustrated in FIG. 2 and FIG. 3. The second protruding element 134 is designed to engage an opposing surface sidewall 126 of the electrical conduit 115. More specifically, the second protruding element 134 is arranged to engage an inner surface 119 of the electrical conduit of the electrical conduit 115. The second protruding element 134 further assists in operably positioning the apparatus relative to the electrical conduit 115 by guiding the apparatus to an engaged position placing the axis 124 of the body portion 102 into a generally colinear relationship with longitudinal axis 103 of the electrical conduit 115. Upon reading this specification, it should be appreciated that, under appropriate circumstances, other physical arrangements such as, for example, integrating one or more permanent magnets within a second protruding element and not the first protruding element, integrating one or more permanent magnets within both the first protruding element and the second protruding element, etc., may suffice.

The vial-containing slot 114 is arranged within the body portion 102 such that the longitudinal axis 107 of the bubble vial 116 is held in a fixed perpendicular relationship with the axis 124 of the magnetically-attractive planar lower surface 106B (see FIG. 4). Thus, readings from the bubble vial 116 may be used as a reference in determining the true angular orientation of axis 124, the magnetically-attractive planar lower surface 106B, and the longitudinal axis 103 of the electrical conduit 115 to which the apparatus is attached. The conduit connection system 120 is configured to cooperatively align the electrical conduit 115 and the apparatus in a fixed geometric relationship and to maintain the relationship during use.

FIG. 3 shows a side view illustrating the magnetic bubble type level 100 in an "in-use" condition where the magnetic bubble type level 100 is engaged on the electrical conduit 115 to be bent. FIG. 4 shows a side view, enlarged for clarity, illustrating the magnetic bubble type level 100 in the 'in-use' condition.

In FIG. 3 and FIG. 4, the magnetic bubble type level 100 is shown engaged on the external surface sidewall 126 of the electrical conduit 115 with the second protruding element 134 extending within the open end 117 of the electrical conduit 115. As described above, the apparatus may be firmly mounted to the conduit, without clamping (which would require the user to adjust a thumbwheel, screw, or similar device to apply a clamping force). Eliminating the step of adjusting a thumbwheel or screw to clamp and also to remove a bubble type level from conduit is an incredible time saver.

FIG. 3 diagrammatically illustrates the electrical conduit 115 engaged in a manual tubing bender 121 of a type commonly used to form field bends in electrical conduit. The user has used the manual tubing bender 121 to apply a force sufficient to bend the electrical conduit to a desired angle. In this example, a 90-degree bend has been formed in the electrical conduit 115, which places the bent conduit segment 123 in a generally vertical orientation, as shown. The user may determine the accuracy of the bend using the bubble level to verify the angular displacement of the adjoining conduit segments. For the depicted 90-degree bend, a level reading from the bubble vial 116 indicates that a 90-degree bend has been successfully achieved. More specifically, the angular orientation of the longitudinal axis 103 of the electrical conduit 115 comprises an angular displacement of 90 degrees, relative to the adjoining portion 125 of the electrical conduit 115 extending horizontally of the bend, when the bubble vial 116 reads level.

FIG. 5 shows a side view illustrating the magnetic bubble type level 100 being disengaged from the electrical conduit 115. Once the angle of the bend has been verified, the magnetic bubble type level 100 is removed from the end of the electrical conduit 115. As above, the magnetic coupling features of the disclosed apparatus allows for quick and efficient decoupling of the magnetic bubble type level 100 from the conduit, without turning a thumbwheel or screw, which is required in all known devices.

FIG. 6 shows an exploded side view of the magnetic bubble type level 100, according to the preferred embodiment of FIG. 1. Visible in FIG. 6 is the body portion 102, bubble vial 116, and permanent magnets 122 shown removed from the recessed bores 138 formed within the magnetically-attractive planar lower surface 106B. The bubble vial 116 is secured within the body portion in a manner that if the bubble vial 116 becomes broken or otherwise damaged, it can be easily replaced and the apparatus need not be discarded.

As above, the bubble vial 116 may be removed from the vial-containing slot 114 formed within the body portion 102, as needed. The arrangements of the vial-containing slot 114 include a threaded opening 140 and a threaded vial retainer 142 receivable within the threaded opening 140. The threaded vial retainer 142 is configured to secure the bubble vial 116 within the vial-containing slot 114 when the threaded vial retainer 142 is received within the threaded opening 140. A shallow bore 144, formed within the body portion 102, is used to capture the distal end of the bubble vial 116 (see also FIG. 2). A resilient O-ring 146 is located between the proximal end of the bubble vial 116 and the threaded vial retainer 142 (a removable retainer) to protect the bubble vial 116 from shock and compression damage. In one implementation of the present disclosure, the threaded vial retainer 142 comprises an 8-32 threaded plug constructed from brass or a similar alloy.

According to one implementation of the present disclosure, the magnetic bubble type level 100 may be arranged as a kit 200. The kit 200 may include an additional replacement bubble vial 116 and instructions 202. The instructions may detail functional relationships in relation to the structure of the magnetic bubble type level 100 (such that the magnetic bubble type level 100 can be used, maintained, or the like, in a preferred manner).

The body portion 102 may be constructed from one or more substantially rigid and durable materials, for example, a non-ferrous metallic material such as aluminum. The body portion 102 may be form using a Computer Numerical Control (CNC) milling process and may comprise a corrosion-resistant anodized finish. Upon reading this specification, it should be appreciated that, under appropriate circumstances, other material arrangements such as, for example, utilization of molded or milled plastics, including indicia using a permanent laser etching process, etc., may be sufficient.

According to one implementation of the present disclosure, the magnetic bubble type level 100 is sized to permit one-handed operation and carrying in a pocket. According to one implementation of the present disclosure, the magnetic bubble type level 100 comprises an overall length D1 of about 2.5 inches (63.5 millimeters), an overall height D2 of about 1.5 inches (38 millimeters) and a width D3 of about 0.5 inch (12.7 millimeters), as shown in FIG. 1. Upon reading this specification, it should be appreciated that, under appropriate circumstances, other size arrangements such as, for example, development of larger or smaller apparatuses, etc., may be sufficient.

Figure 7:
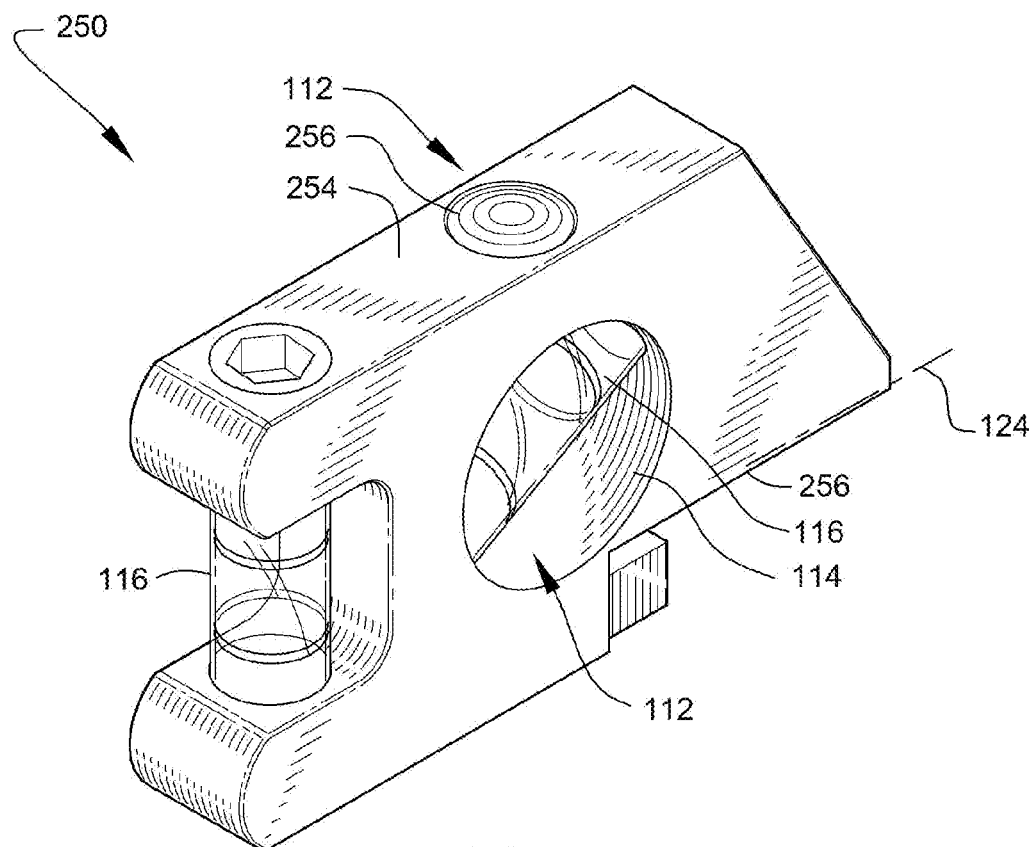
FIG. 7 shows a perspective view of a magnetic bubble type level according to another implementation of the present disclosure.
Figure 8:
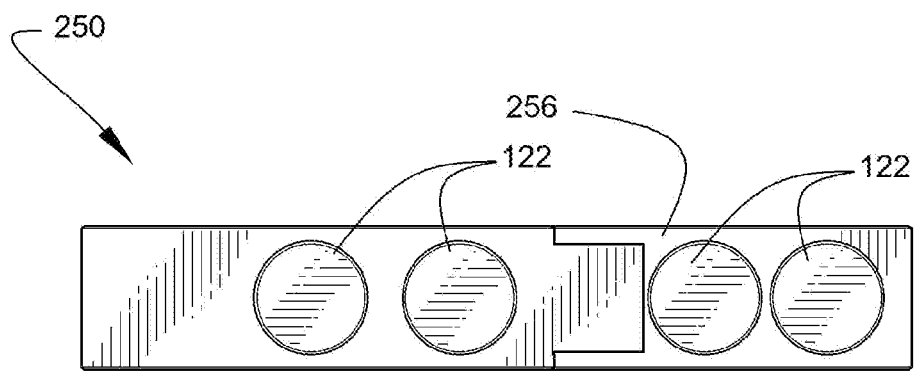
FIG. 8 shows a bottom view of the magnetic bubble type level of FIG. 7.

FIG. 7 shows a perspective view of a magnetic bubble type level 250 according to another implementation of the present disclosure. FIG. 8 shows a bottom view of the alternate magnetic bubble type level 250, according to the preferred embodiment of FIG. 7. It should be understood that the basic structure of the alternate implementation of the magnetic bubble type level 250 is substantially the same as that of the previously described implementation, and thus only the differences therebetween will be discussed in detail.

The most significant differences between the first implementation and the alternate magnetic bubble type level 250 are the integration of additional level indicators 112 and additional permanent magnets 122 within the device, as shown. In particular, the alternate magnetic bubble type level 250 comprises a second vial-containing slot 114 and bubble vial 116. This bubble vial 116 is oriented at an angle of 45 degrees relative to axis 124 (oriented generally parallel to the magnetically-attractive planar lower surface 256 of the apparatus, as shown). In addition, the alternate magnetic bubble type level 250 comprises a bulls-eye type bubble level 256 located within the top surface 254 of the body portion, as shown.

Referring to the bottom view of FIG. 8, the alternate magnetic bubble type level 250 comprises two additional permanent magnets 122, as shown. These magnets are located in a manner allowing the alternate magnetic bubble type level 250 to be more easily located at any point along the length of a conduit.

Figure 9:
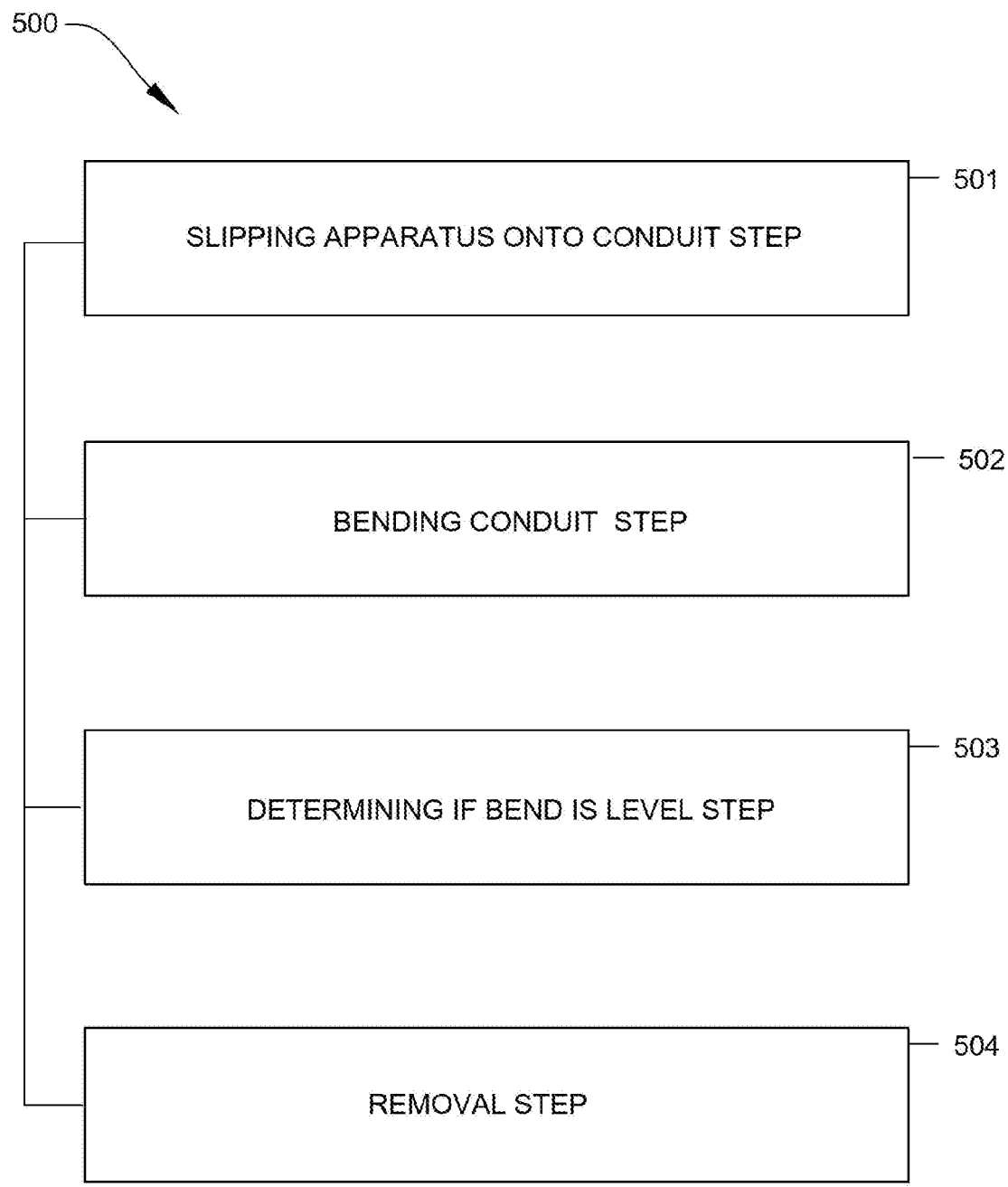
FIG. 9 is a flow diagram illustrating a method of determining the angular displacement of a bend in an electrical conduit after bending using a magnetic bubble type level of the present disclosure.

FIG. 9 is a flow diagram illustrating a method 500 of determining whether electrical conduit is level after bending, according to an implementation of the present disclosure. As illustrated, the method 500 may include the steps of: step one 501, slipping an apparatus comprising at least one bubble level onto the sidewall of electrical conduit without turning a thumbwheel or screw to secure the apparatus to the electrical conduit; step two 502, bending the electrical conduit to the desired angle; step three 503, determining if the bend is level using the bubble level; step four 504, pulling off the apparatus without turning a thumbwheel or screw.

It should be noted that, under appropriate circumstances, other methods associated with the magnetic bubble type level 100 (e.g., different step orders within above-mentioned list, elimination or addition of certain steps, including or excluding certain maintenance steps, etc.), are taught herein.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method of determining whether electrical conduit is level after bending comprising the steps of:
   slipping an apparatus comprising at least one bubble level onto a sidewall of electrical conduit at an open end of the electrical conduit, without turning a thumbwheel or screw, the apparatus comprising at least one magnet to secure the apparatus to the sidewall of electrical conduit;
   bending the electrical conduit to a desired angle;
   determining if the bend is level using the bubble level of the apparatus; and
   pulling off the apparatus from the sidewall of the electrical conduit without turning a thumbwheel or screw.

2. The method of claim 1, the step of slipping the apparatus comprising at least one bubble level onto the sidewall of electrical conduit at the open end of the electrical conduit, without turning a thumbwheel or screw, the apparatus comprising at least one magnet to secure the apparatus to the sidewall of electrical conduit performed by one hand of a user.

3. The method of claim 1, the step of pulling off the apparatus from the sidewall of the electrical conduit without turning a thumbwheel or screw performed by one hand of a user.

4. The method of claim 2, the step of pulling off the apparatus from the sidewall of the electrical conduit without turning a thumbwheel or screw performed by one hand of a user.

5. An apparatus to assist determining whether electrical conduit is level, said apparatus comprising:
  a body comprising at least one bubble level and an electrical conduit connection system to connect said apparatus to electrical conduit without tightening the apparatus to the electrical conduit; and
  the electrical conduit connection system comprising a magnet-containing protruding element having a planar lower surface that magnetically attaches to a surface sidewall at an open end of the electrical conduit.

6. The apparatus of claim 5 comprising a second protruding element, said second protruding element being of shorter length than the magnet containing protruding element, and said second protruding element engages an opposing surface sidewall of the electrical conduit.

7. The apparatus of claim 5, said magnet containing protruding element is configured to engage an outer surface of the electrical conduit.

8. The apparatus of claim 6, said magnet containing protruding element is configured to engage an outer surface of the electrical conduit and said second protruding element is configured to engage an inner surface of the electrical conduit of the electrical conduit.

9. The apparatus of claim 5, said magnet containing protruding element containing at least two magnets.

10. The apparatus of claim 9, said at least two magnets arranged in colinear alignment.

11. The apparatus of claim 5, said body comprising at least two bubble levels.

12. The apparatus of claim 11, said body further comprising at least one bulls-eye bubble level.

13. The apparatus of claim 5, the apparatus sized to be used by one hand and to fit into a pocket.

14. A level to assist determining whether electrical conduit is level comprising:
  at least one level indicator;
  a body having a top surface, a lower surface, a front portion, a rear portion and at least one slot to receive said at least one level indicator; and
  said lower surface having a conduit connection portion that connects to an open end of electrical conduit, said conduit connection portion comprising at least one magnet to secure the level to a sidewall surface of the electrical conduit by attractive force between the electrical conduit sidewall and said at least one magnet and without an opposing force on an opposing sidewall surface of the electrical conduit.

15. The level of claim 14 further comprising, a protruding positioning element that is extendable into the open end of the electrical conduit to assist positioning the electrical conduit in a colinear orientation with said at least one magnet.

16. The level of claim 14, said level indicator comprising a bubble type level.

17. The level of claim 14, said slot comprising a removable retainer to removably retain said level indicator within said slot.

18. The level of claim 14 sized to be used by one hand and to fit into a pocket.

19. The apparatus of claim 5, said at least one bubble level is fixed in a vertical orientation relative to a longitudinal axis of the electrical conduit and said at least one bubble level is viewable from at least a rear of the apparatus, a left side of the apparatus, and a right side of an apparatus.

20. The apparatus of claim 11, said at least two bubble levels comprising a first bubble level fixed in a vertical orientation relative to a longitudinal axis of the electrical conduit and a second bubble level at a fixed angle relative to the longitudinal axis of the electrical conduit.

* * * * *